March 8, 1955
M. L. SHEPHERD
2,703,467
FISHHOOK GUARD
Filed March 3, 1952
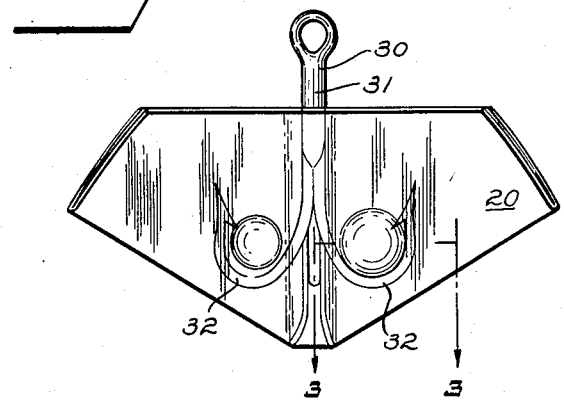
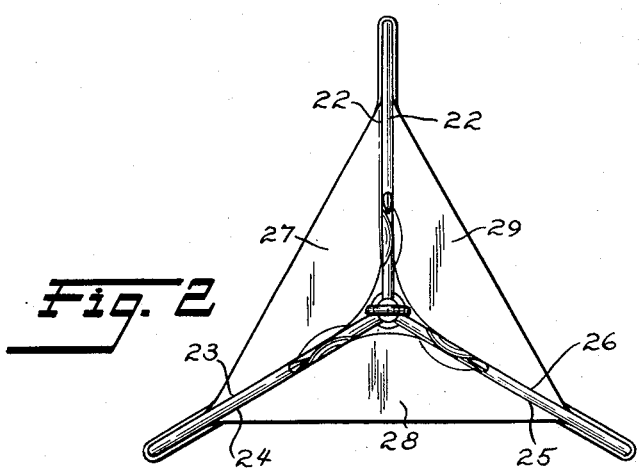
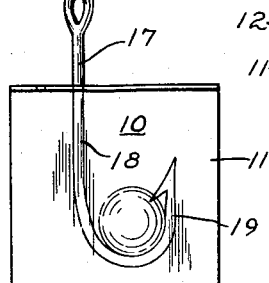
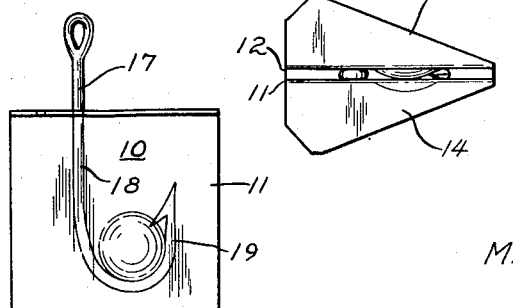
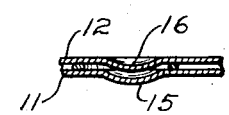
INVENTOR
MARSHAL L. SHEPHERD
BY *Jones and Young*
AGENTS

2,703,467

FISHHOOK GUARD

Marshal L. Shepherd, Myrtle Beach, S. C.

Application March 3, 1952, Serial No. 274,539

4 Claims. (Cl. 43—57.5)

The present invention relates to a detachable guard for fish hooks and more particularly to a light weight detachable guard for positively retaining the lower half or barb portion of a fish hook to prevent any accidental "hooking" of the skin or clothing of a user.

Most fishermen usually carry a great many fish hooks of varying size and design as well as many different types of flies and the like which likewise contain fishing hooks. This practice tends to create a problem since the fisherman continually runs the risk of accidentally "hooking" himself with the barb portion of a hook. Such an accident is quite painful and the possibility of a serious infection therefrom is quite high since proper medical care under such circumstances is not readily available. Moreover, the presence of so many different type fish hooks in a single tackle box results quite often in the hooks becoming entangled with one another. To separate these hooks often requires considerable time and effort on the part of the user.

To eliminate these problems, some attempts have been made to provide devices or guards which would encase the barb portion of the fish hook and could be withdrawn when the hook was to be used. However, these prior attempts have met with little success. For example, certain prior guards acceptable in some respects were unsatisfactory since they did not positively ensure the retention of the barb within the guard. This resulted in fishermen becoming "hooked" when they thought they were completely protected. The prior guards which were more satisfactory as far as retention of the hook was concerned were of very bulky and complex construction. Such construction was completely unfeasible since the guards materially increased the weight of the fishing tackle and also reduced the amount of tackle that could be carried. Moreover, the cost of such complex guards was prohibitive thus rendering the marketing of such devices commercially unfeasible. Another disadvantage to these prior devices is the inability of such devices to successfully retain multi-barb hooks therein.

It is, therefore, a principal object of the present invention, in the elimination of the foregoing and related disadvantages, to provide a fish hook guard that will positively retain the barb portion of a fish hook therein at all times.

Another object of the present invention is to provide a light, inexpensive and compact fish hook guard of very simple construction.

Yet another object of the present invention is to provide a fish hook guard of such construction that the fish hook may be inserted or withdrawn in an instant.

Still another object of the present invention is to provide a guard for multi-barb fish hooks that will retain each barb in a secure position.

Still another object of the present invention is to provide a guard for fish hooks which will prevent the entanglement of the hooks with one another and with the artificial baits or plugs present in the normal tackle box.

A still further object of the present invention is to provide a fish hook guard which can be placed on the fish hook by the manufacturer and will thus facilitate and materially improve the manufacture, distribution, marketing and use of fish hooks.

Other and additional objects and advantages will be manifest from the following description taken in conjunction with the annexed drawing.

Briefly, in accordance with the present invention, the improved fish hook guard comprises at least two flexible mating side walls closely spaced from one another and joined to each other along their bottom edge to define the receptacle into which the fish hook barb is to be inserted. The lower half of each side wall is provided with an offset or dimple with the offsets substantially nesting one into the other. That is to say, the offsets are offset in the same direction. This offset construction seats above the curvature of the fish hook barb when inserted between the side walls thus preventing the withdrawal of the fish hook without a strong pull. The top free end of each side wall may be provided with a shoulder flange for the purpose of pulling the side walls apart for ready insertion or withdrawal of a fish hook. These shoulder flanges serve as braces at the top of the side walls and greatly strengthen and increase the rigidity of the guard, thus enabling the use of a relatively thin sheet plastic for this guard.

To the accomplishment of the foregoing and related ends, the present invention then consists of the means hereinafter fully described and particularly pointed out in the claims, the annexed drawing and the following description setting forth in detail certain means in the carrying out of the invention, such disclosed means illustrating, however, but one of various ways in which the principle of the invention may be employed.

The present invention is illustrated, by way of example, in the accompanying drawing in which:

Fig. 1 is a side elevation of a multi-barb fish hook guard made in accordance with the present invention with a fish hook inserted therein;

Fig. 2 is a top plan view of the fish hook guard shown in Fig. 1;

Fig. 3 is a fragmentary sectional view taken on lines 3—3 of Fig. 1 illustrating the nesting effect which positively retains the fish hook in place;

Fig. 4 is a side elevation of a fish hook guard made in accordance with the present invention for use with a fish hook having a single barb; and Fig. 5 is a top plan view of the fish hook guard shown in Fig. 4.

Referring now to the drawing in detail, and with particular reference to Figs. 3, 4 and 5, an illustrative embodiment of one form of the improved fish hook guard of the present invention comprises a pocket portion 10, preferably formed from a suitable transparent or translucent thermoplastic material, consisting of mating front and rear walls 11 and 12 spaced apart slightly from one another at a distance somewhat less than the thickness of the fish hook to be inserted therein. By this construction, the fish hook, when inserted between the front and rear walls 11 and 12, will be held in tight engagement and thus lessen the possibiuity of any lateral slippage. The front and rear walls 11 and 12 are each provided with flanged shoulder portions 13 and 14 at their top free edges thereof, with the flanged portions 13 and 14 diametrically opposed to one another. The flanged shoulder portions 13 and 14 act as handle means for a user to spread the walls 11 and 12 apart slightly when necessary. Nesting offsets or dimples 15 and 16 are formed on the lower portion of front and rear walls 11 and 12, respectively. The offsets 15 and 16 are preferably circular in configuration to conform with the curved arc of a fish hook to positively prevent any accidental vertical movement of the fish hook. It is to be noted that the offsets 15 and 16 do not completely nest within one another in that the surfaces of the offsets do not actually meet. Rather, the spacing between the offsets 15 and 16 will be substantially the same distance as the spacing of the side walls 11 and 12.

The fish hook guard just described may be formed from a single piece of transparent or translucent sheet plastic such as vinylite, Celluloid, light gauge metal, or any suitable material that is semi-rigid but still retains some resiliency. Prior to forming the fish hook guard the offsets 15 and 16 are first formed by "bumping" or the like at predetermined points such that when the fish hook guard is ultimately formed, the offsets 15 and 16 will extend in the same direction and properly nest with one another. The plastic sheet is then folded upon itself with the front and rear walls 11 and 12 mating to form the receptacle 10 and the offsets 15 and 16 nesting with one another. The flanged portions 13 and 14 are then bent at right angles to their respective walls 12 and 11. It should be noted that the entire guard may be molded by specially designed and adjustable heated dies in a single stamping or molding operation. In this operation the heat distortion point of the specific material, thermoplastic, is employed.

It is to be noted that by using an oblong sheet of plastic there will be no side walls present therein. There are many other ways that may be employed to produce a fish hook guard having mating front and rear wall portions and nesting offsets and I do not, therefore, wish the invention to be limited to any particular method of manufacture.

To use the fish hook guard shown in Figs. 3, 4 and 5, the fish hook 17, having a shank portion 18 and a curved barb portion 19, is inserted from the top of the pocket 10 between the front and rear walls 11 and 12. The fish hook 17 is then pressed between the side walls downwardly until the bottom part of the barb portion 19 strikes the offset 16. Further pressure will result in the barb portion riding over and downwardly between the offsets 15 and 16 with the curvature of the barb portion 19 generally conforming to the curvature of the offsets 15 and 16. This action results in the positive retention of the fish hook 17 within the pocket 10 with the upper half of the fish hook shank 18 being above the flanged shoulder portions 13 and 14. To withdraw the fish hook from the pocket 10, the front and rear walls 11 and 12 are spaced apart slightly by means of the flanged shoulder portions 13 and 14 and the fish hook withdrawn by pulling upwardly. This results in the barb portion 19 riding over and between the curved surface of the offsets 15 and 16.

Reference is now to be had to Figs. 1, 2, and 3, wherein another form of my improved fish hook guard is shown for use with a three-barbed fish hook. The three-barbed fish hook guard comprises a receptacle 20 formed from any material hereinbefore indicated as being suitable for use. The receptacle 20 comprises a first pair of mating side walls 21 and 22, a second pair of mating side walls 23 and 24, and a third pair of mating side walls 25 and 26. The three pairs of side walls are connected to one another to define a triangular shaped receptacle by having side 22 connected along its inner side edge to the inner side edge of side 23, the inner side edge of wall 24 is joined to the inner side edge of wall 25 with the inner side edge of wall 26 united to the inner side edge of wall 21. It is to be noted that the union of these various side walls to one another defines a curved surface in each instance in order to permit the insertion of a fish hook within the receptacle. The various pairs of side walls are joined to one another at their bottom edges in a similar manner as hereinbefore described. Each pair of wall portions 21—22, 23—24, and 25—26, are provided with flanged shoulder portions 27, 28 and 29, which are angular in configuration and connect the top free edges of the pairs of side walls in the manner shown. It is to be noted that the spacing between the side walls of each pair with respect to one another is to be of substantially the same distance as that of the single fish hook guard hereinbefore described. Each pair of respective side walls 21—22, 23—24, and 25—26, are provided with offsets 15 and 16, respectively. These offsets 15 and 16 are of identical construction and configuration as described with respect to the fish hook guard and next within one another in a similar manner. Moreover, the spacing between such offsets 15 and 16 is substantially the same whether it be for a single fish hook guard or for a multi-barbed fish hook guard.

The multi-barbed fish hook guard just described may be formed from a single blank of transparent plastic material or the like. Prior to forming the fish hook guard, the plastic sheet should be scored and cut so as to produce a triangular configuration resulting from the union of the several pairs of front and rear walls to one another. The offsets 15 and 16 are then formed in predetermined position on the scored blank. The blank is then folded to form the receptacle 20. It is to be noted that the bottom edges of the several pairs of walls are angular in configuration thus resulting in only a portion of their side walls being free. By this construction stronger rigidity is obtained yet permitting the pulling apart of the side walls from one another sufficiently to permit the withdrawal of the fish hook.

To use a three-barbed fish hook with this form of the invention the fish hook 30, comprising a shaft 31 and three curved barb portions 32 secured to the shaft portion, is placed on the receptacle 20 with the shaft portion in vertical alignment with the center portion of the receptacle 20 formed by the junction of the several pairs of walls. This results in the placement of the curved barb portions in the slots formed by the mating of the front and rear walls. The fish hook 30 is then pushed downwardly with the curved barb portion riding over and between the offset portions 15 and 16 in the manner identical with that hereinbefore discussed with respect to the single fish hook. To withdraw the fish hook the walls forming the receptacle 20 are pulled apart slightly by the flanged shoulders 27, 28 and 29, and the fish hook drawn out in the same manner as that employed in connection with the single fish hook.

While the invention has been described in connection with a single hook and a three-barbed hook, it is obvious that the invention is adaptable for use with any type of fish hook employing a shaft portion and a curved barb portion without regard to the number of barb portions.

As hereinbefore indicated, the fish hook guard of the present invention may be made of any suitable material. A light weight transparent thermoplastic sheet such as vinylite is preferred since such material is inexpensive and readily available and possesses the desired rigidity yet flexible enough to permit press fitting of the fish hook therein. However, the fish hook guard of this invention may be made from other materials which possess the necessary properties sufficient to impart rigidity as well as flexibility to the completed article. For example, Celluloid or very light gauge metal such as aluminum can be employed. The metal fish hook guards would be relatively expensive as well as lacking in some of the desired characteristics and thus metal is commercially less desirable.

Having described my invention, I claim:

1. A plastic fishhook guard comprising at least a pair of plastic, flexible mating walls united along at least one edge to form a receptacle with the mating walls in closely spaced, substantially parallel relationship to one another and having a small, circular offset formed on each one of said side walls adjacent the uniting edge of said walls, said offsets of the mating walls nesting within one another in spaced relationship and being of a circumference that will substantially correspond to the curvature of the fishhook, said guard having a flanged shoulder portion connected to each of said side walls along their respective top edges and extending laterally and outwardly therefrom.

2. A plastic fishhook guard comprising a pair of plastic, flexible mating walls united along at least one edge to form a receptacle with the mating walls in closely spaced, substantially parallel relationship to one another and having a small, circular offset formed on each one of said side walls adjacent the uniting edge of said walls, said offsets of the mating walls nesting within one another in spaced relationship and being of a circumference that will substantially correspond to the curvature of the fishhook, said guard having a flanged shoulder portion connected to each of said side walls along their respective top edges and extending laterally and outwardly therefrom.

3. A plastic multi-barb fishhook guard comprising a plurality of pairs of plastic, flexible mating walls united along at least one edge to form a receptacle with the mating walls of each pair in closely spaced, substantially parallel relationship to one another, each pair of said mating walls connected to one another along their respective side edges and having a small circular offset formed on each one of said side walls adjacent the uniting edge of said side walls, said offsets of each pair of mating walls nesting within one another in spaced relationship and being of a circumference that will substantially correspond to the curvature of the fishhook, said guard having flanged shoulder portions connected to each pair of said side walls along their respective top edges and extending laterally and outwardly therefrom at substantially right angles thereto.

4. A plastic multi-bar fishhook guard comprising a plurality of pairs of plastic flexible mating walls united along at least one edge to form a receptacle with the mating walls on each pair in closely spaced, substantially parallel, relationship to one another, each pair of said mating walls being angularly disposed with respect to one another and connected to one another along their respective side edges and having a small circular offset formed on each one of said side walls adjacent the uniting edge of said side walls, said offsets of each pair of mating walls nesting within one another in spaced relationship and being of a circumference that will substantially correspond to the curvature of the fishhook, said guard having flanged shoulder portions connected to each pair of said side walls along their respective top edges and extending laterally and outwardly therefrom at substantially right angles thereto and said flanged shoulder portions connecting one side wall of each pair of mating walls with an adjacent side wall of each pair of mating walls.

References Cited in the file of this patent

UNITED STATES PATENTS

| | | |
|---|---|---|
| 1,255,516 | Daller | Feb. 5, 1918 |
| 2,173,395 | Heiner | Sept. 19, 1939 |
| 2,204,185 | Lougheed | June 11, 1940 |
| 2,616,209 | Ploen | Nov. 4, 1952 |

FOREIGN PATENTS

| | | |
|---|---|---|
| 254,726 | Switzerland | May 31, 1948 |
| 277,551 | Switzerland | Dec. 1, 1951 |